(12) United States Patent
Katou et al.

(10) Patent No.: US 7,291,078 B2
(45) Date of Patent: Nov. 6, 2007

(54) CONTROL OF BELT-TYPE CONTINUOUSLY VARIABLE TRANSMISSION

(75) Inventors: Yoshiaki Katou, Kanagawa (JP); Yoshihiro Kono, Shizuoka (JP)

(73) Assignee: Jatco Ltd, Shizuoka (JP)

( * ) Notice: Subject to any disclaimer, the term of this patent is extended or adjusted under 35 U.S.C. 154(b) by 636 days.

(21) Appl. No.: 10/828,459

(22) Filed: Apr. 21, 2004

(65) Prior Publication Data
US 2004/0214669 A1    Oct. 28, 2004

(30) Foreign Application Priority Data
Apr. 24, 2003   (JP) ............................. 2003-119358

(51) Int. Cl.
*F16H 59/06*  (2006.01)
*F16H 61/06*  (2006.01)

(52) U.S. Cl. .......................................... 474/28; 474/18

(58) Field of Classification Search .................. 474/18, 474/28, 23, 46, 69–70; 477/44–50; 701/51
See application file for complete search history.

(56) References Cited

U.S. PATENT DOCUMENTS

| | | | | |
|---|---|---|---|---|
| 4,790,214 | A * | 12/1988 | Hattori et al. ................. | 701/51 |
| 5,157,992 | A * | 10/1992 | Hayashi et al. ............... | 474/28 |
| 5,183,439 | A * | 2/1993 | Yumoto et al. ................ | 474/28 |
| 5,211,083 | A * | 5/1993 | Hattori et al. ................. | 477/39 |
| 5,514,047 | A * | 5/1996 | Tibbles et al. ................. | 477/46 |
| 6,086,513 | A * | 7/2000 | Tominaga ..................... | 477/169 |
| 6,338,695 | B1 | 1/2002 | Aoki et al. | |
| 6,379,278 | B1 * | 4/2002 | Eguchi et al. ................. | 477/44 |
| 6,695,742 | B2 * | 2/2004 | Hagiwara et al. ............. | 477/46 |

FOREIGN PATENT DOCUMENTS

| | | | |
|---|---|---|---|
| EP | 1176341 A2 | * | 1/2002 |
| GB | 2076483 A | * | 12/1981 |
| JP | 10-141455 A | * | 5/1998 |
| JP | 2001-032916 A | | 2/2001 |
| JP | 2002-39352 A | * | 2/2002 |

* cited by examiner

*Primary Examiner*—Marcus Charles
(74) *Attorney, Agent, or Firm*—Foley & Lardner LLP

(57) ABSTRACT

A gear change control system of a belt-type continuously variable transmission includes: a movable pulley piston chamber for causing a thrust force to a movable pulley varying a groove width of primary pulley and secondary pulley. The movable pulley piston chamber has double-piston constitution including: a primary clamp chamber and a secondary clamp chamber, for causing a clamp force of clamping the belt, and a cylinder chamber including a primary pulley cylinder chamber and a secondary pulley cylinder chamber, for causing a differential thrust force at a gear change. A clamp chamber oil pressure setting section sets up a clamp chamber oil pressure by the following calculation: dividing the one of the primary thrust force and the secondary thrust force by addition of: applied pressure area of one of the primary clamp chamber and the secondary clamp chamber, and applied pressure area of the cylinder chamber on a selected side.

16 Claims, 9 Drawing Sheets

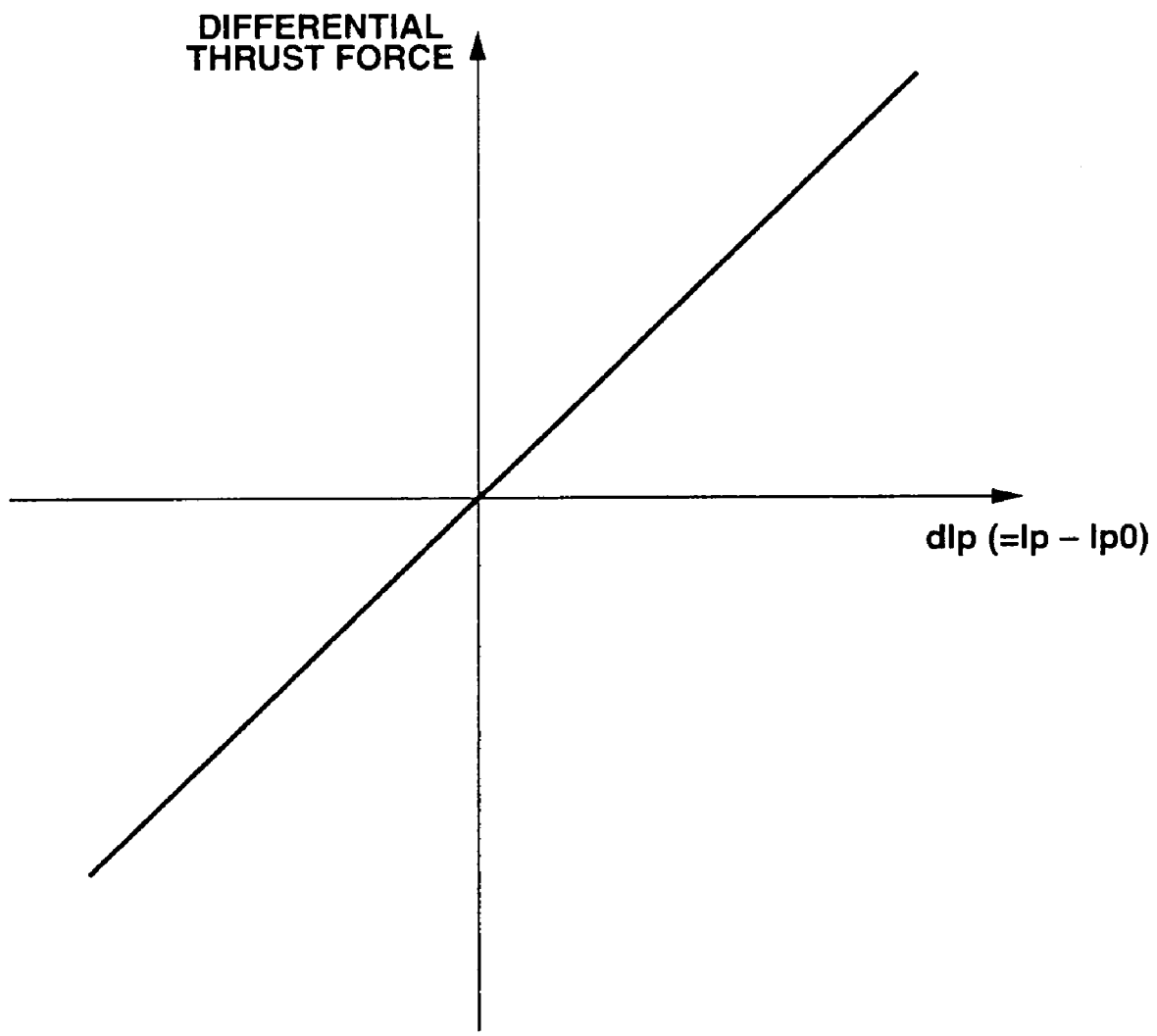

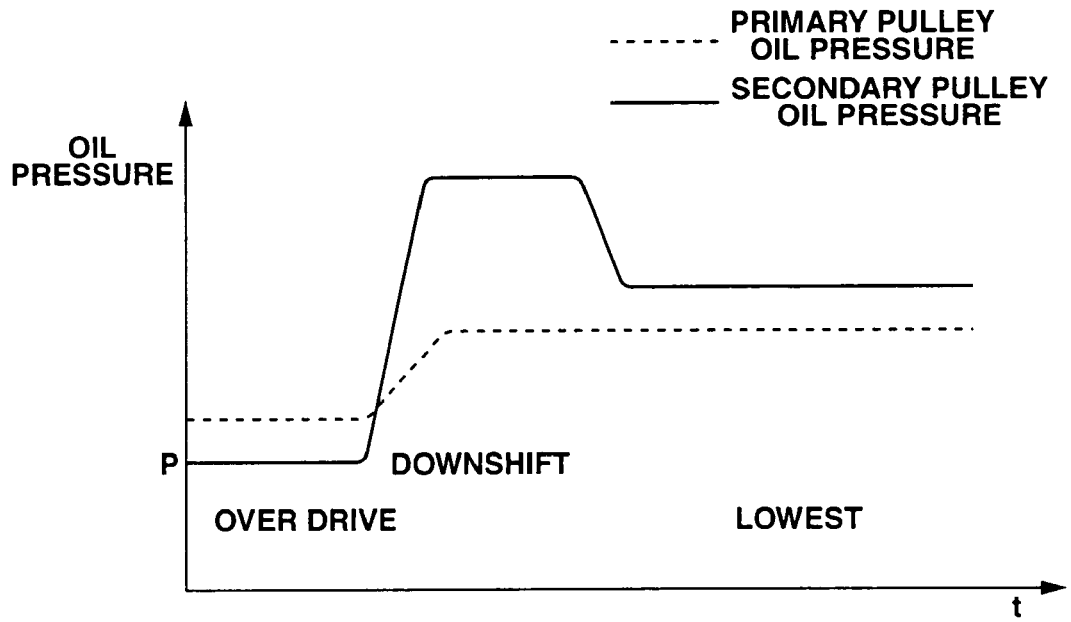
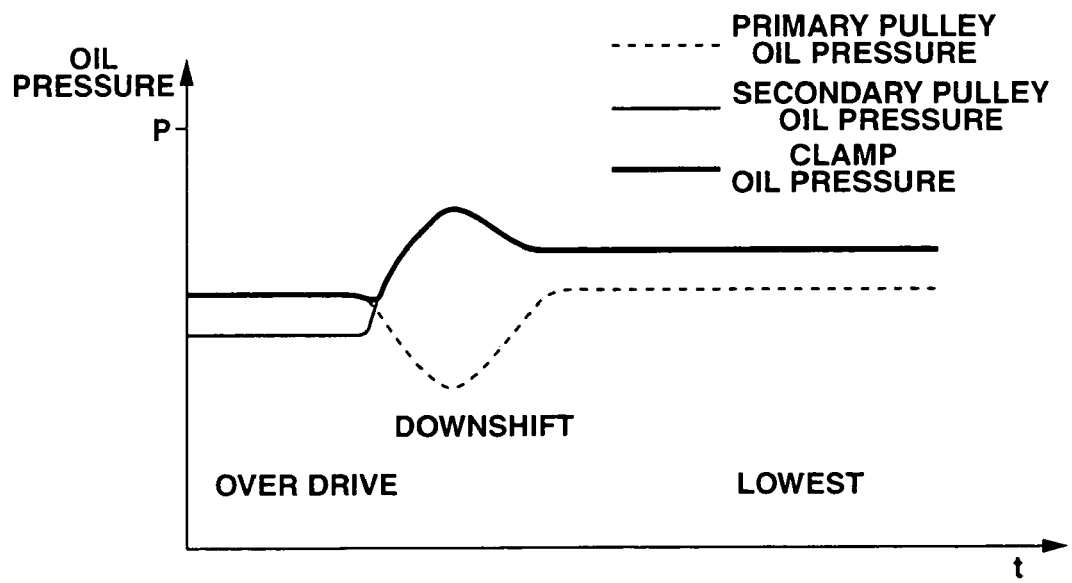

CONTROL OF BELT-TYPE CONTINUOUSLY VARIABLE TRANSMISSION

BACKGROUND OF THE INVENTION

1. Field of the Invention

The present invention relates to a control of a belt-type continuously variable transmission. Especially, the present invention relates to a gear change oil pressure control system for controlling a primary pulley's oil pressure independently of a secondary pulley's oil pressure.

2. Description of the Related Art

U.S. Pat. No. 6,338,695 (equivalent of Japanese Patent Unexamined Publication No. 2001-32916 [=JP2001032916]) discloses a gear change oil pressure control system of an automatic transmission (referred to as "vehicular transmission control system in English abstract"). The gear change oil pressure control system has two control valves, including a control valve for controlling a primary pulley oil pressure and a control valve for controlling a secondary pulley oil pressure. In the above system, an oil pressure required for a primary pulley is controllable independently of an oil pressure required for a secondary pulley.

According to U.S. Pat. No. 6,338,695 (equivalent of Japanese Patent Unexamined Publication No. 2001-32916 [=JP2001032916]), however, the oil pressure of one of the pulleys that is in need for a high oil pressure at a gear change is expected to obtain a higher oil pressure than the other of the pulleys. Hereinafter described is an assumed state that a pulley ratio is changed from an over drive (OD) side to a lowest side with a kick down and the like.

FIG. 6(a) shows a time chart including variation in the primary pulley oil pressure and the secondary pulley oil pressure. The pulley ratio in the over drive state keeps the primary pulley oil pressure higher than the secondary pulley oil pressure. Then, with an accelerator stepped on and thereby a kick down gear change instruction inputted, the primary pulley oil pressure may be set higher than in the over drive state, such that a belt slippage can be prevented. Moreover, the secondary pulley oil pressure is set still higher than the primary pulley oil pressure which is set high for promoting the gear change. With this, a differential thrust force can be secured, thus achieving at last a lowest gear change. This may be in need for a pump capable of generating a high oil pressure, increasing a pump loss and the like.

BRIEF SUMMARY OF THE INVENTION

It is an object of the present invention to provide a control system of a belt-type continuously variable transmission where a primary pulley oil pressure and a secondary pulley oil pressure can be controlled independently of each other.

It is another object of the present invention to allow the control system to achieve a quick gear change which system is in no need for a high pressure even when a gear change ratio may vary greatly.

According to a first aspect of the present invention, there is provided a gear change control system of a belt-type continuously variable transmission, comprising:

I) a movable pulley piston chamber for causing a thrust force to a movable pulley which varies a groove width of each of a primary pulley and a secondary pulley, the movable pulley piston chamber having a double-piston constitution including:
  a) a clamp chamber including a primary clamp chamber and a secondary clamp chamber, for causing a clamp force of clamping the belt, and
  b) a cylinder chamber including a primary pulley cylinder chamber and a secondary pulley cylinder chamber, for causing a differential thrust force at a gear change;

II) a communication passage communicating the primary clamp chamber with the secondary clamp chamber, a clamp chamber's applied pressure area on a primary side being substantially equal to a clamp chamber's applied pressure area on a secondary side;

III) a gear change control valve for controlling an oil pressure of the cylinder chamber;

IV) a clamping force setting valve disposed between an oil pressure source and the communication passage, the clamping force setting valve setting an oil pressure of the clamp chamber; and V) a gear change control section for achieving a certain gear change ratio by outputting an instruction signal to the gear change control valve and the clamping force setting valve in accordance with a sensed traveling state.

The gear change control section includes;
  a) a primary thrust force calculating section for calculating a primary thrust force of the movable pulley on the primary side,
  b) a secondary thrust force calculating section for calculating a secondary thrust force of the movable pulley on the secondary side,
  c) a thrust force selecting section for selecting one of the primary thrust force and the secondary thrust force that is greater than the other, and
  d) a clamp chamber oil pressure setting section for setting up a clamp chamber oil pressure by a following calculation:
    dividing the selected one of the primary thrust force and the secondary thrust force by an addition of:
      the clamp chamber's applied pressure area of one of the primary clamp chamber and the secondary clamp chamber, and
      a cylinder chamber's applied pressure area of the cylinder chamber on a selected side.

According to a second aspect of the present invention, there is provided a gear change control method of a belt-type continuously variable transmission which includes: I) a movable pulley piston chamber for causing a thrust force to a movable pulley which varies a groove width of each of a primary pulley and a secondary pulley, the pulley piston chamber having a double-piston constitution including: a) a clamp chamber including a primary clamp chamber and a secondary clamp chamber, for causing a clamp force of clamping the belt, and b) a cylinder chamber including a primary pulley cylinder chamber and a secondary pulley cylinder chamber, for causing a differential thrust force at a gear change; II) a communication passage communicating the primary clamp chamber with the secondary clamp chamber, a clamp chamber's applied pressure area on a primary side being substantially equal to a clamp chamber's applied pressure area on a secondary side; III) a gear change control valve for controlling an oil pressure of the cylinder chamber; IV) a clamping force setting valve disposed between an oil pressure source and the communication passage, the clamping force setting valve setting an oil pressure of the clamp chamber; and V) a gear change control section for achieving a certain gear change ratio by outputting an instruction signal to the gear change control valve and the clamping force setting valve in accordance with a sensed traveling state.

The gear change control method comprises:
  a) a first step for calculating a primary thrust force of the movable pulley on the primary side,
  b) a second step for calculating a secondary thrust force of the movable pulley on the secondary side,
  c) a third step for selecting one of the primary thrust force and the secondary thrust force that is greater than the other, and d) a fourth step for setting up a clamp chamber oil pressure by a following calculation:
dividing the selected one of the primary thrust force and the secondary thrust force by an addition of:
the clamp chamber's applied pressure area of one of the primary clamp chamber and the secondary clamp chamber, and
a cylinder chamber's applied pressure area of the cylinder chamber on a selected side.

According to a third aspect of the present invention, there is provided a gear change control system of a belt-type continuously variable transmission which includes: I) a movable pulley piston chamber for causing a thrust force to a movable pulley which varies a groove width of each of a primary pulley and a secondary pulley, the pulley piston chamber having a double-piston constitution including: a) a clamp chamber including a primary clamp chamber and a secondary clamp chamber, for causing a clamp force of clamping the belt, and b) a cylinder chamber including a primary pulley cylinder chamber and a secondary pulley cylinder chamber, for causing a differential thrust force at a gear change; II) a communication passage communicating the primary clamp chamber with the secondary clamp chamber, a clamp chamber's applied pressure area on a primary side being substantially equal to a clamp chamber's applied pressure area on a secondary side; III) a gear change control valve for controlling an oil pressure of the cylinder chamber; IV) a clamping force setting valve disposed between an oil pressure source and the communication passage, the clamping force setting valve setting an oil pressure of the clamp chamber; and V) a gear change control section for achieving a certain gear change ratio by outputting an instruction signal to the gear change control valve and the clamping force setting valve in accordance with a sensed traveling state.

The gear change control system comprises:
a) a first means for calculating a primary thrust force of the movable pulley on the primary side,
b) a second means for calculating a secondary thrust force of the movable pulley on the secondary side,
c) a third means for selecting one of the primary thrust force and the secondary thrust force that is greater than the other, and
d) a fourth means for setting up a clamp chamber oil pressure by a following calculation:
dividing the selected one of the primary thrust force and the secondary thrust force by an addition of:
the clamp chamber's applied pressure area of one of the primary clamp chamber and the secondary clamp chamber, and
a cylinder chamber's applied pressure area of the cylinder chamber on a selected side.

The other object(s) and feature(s) of the present invention will become understood from the following description with reference to the accompanying drawings.

BRIEF DESCRIPTION OF THE SEVERAL VIEWS OF THE DRAWINGS

FIG. 5 shows a differential thrust map including a required differential thrust force relative to a deviation of an actual gear change ratio Ip0 from a target gear change ratio Ip, according to the first embodiment of the present invention.

FIG. 6 shows a time chart including variation in a primary pulley oil pressure and a secondary pulley oil pressure at a gear change, in which
FIG. 6(a) is according to a related art, and
FIG. 6(b) is according to the first embodiment of the present invention.

DETAILED DESCRIPTION OF THE EMBODIMENT

In the following, various embodiments of the present invention will be described in detail with reference to the accompanying drawings.

For ease of understanding, the following description will contain various directional terms, such as left, right, upper, lower, forward, rearward and the like. However, such terms are to be understood with respect to only a drawing or drawings on which the corresponding part of element is illustrated.

First Embodiment

Figure 1:
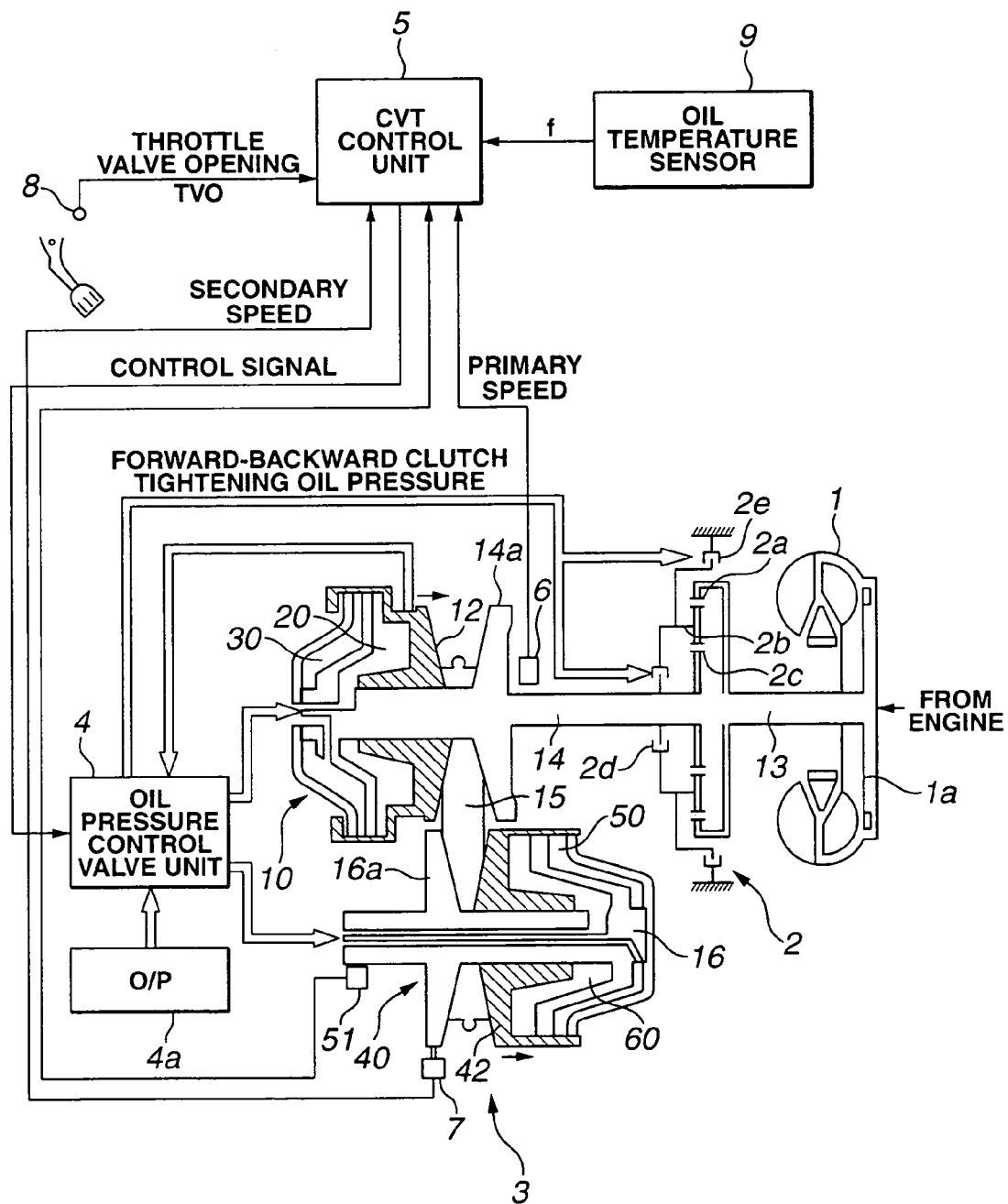
FIG. 1 shows a constitution of a main unit of a vehicle which is provided with a belt-type continuously variable transmission, according to an embodiment of the present invention.

FIG. 1 shows a control system of an automatic transmission which is provided with a belt-type continuously variable transmission 3 (hereinafter referred to as "CVT 3"), according to a first embodiment of the present invention.

There are provided a torque converter 1, a lockup clutch 1a, the CVT 3, an oil pressure control valve unit 4, an oil pump 4a, a CVT control unit 5, a primary speed sensor 6, a secondary speed sensor 7, a throttle opening sensor 8, an oil temperature sensor 9, and a torque sensor 51 (for sensing a torque of a follower shaft 16).

An output shaft of an engine is connected with the torque converter 1 as a rotation transmitting mechanism. Moreover, the output shaft of the engine is provided with a lockup clutch 1a for directly connecting the engine with the CVT 3. An output shaft 13 of the torque converter 1 is connected to a ring gear 2a of a forward-backward switch mechanism 2. The forward-backward switch mechanism 2 is constituted of a planet gear mechanism including: 1) the ring gear 2a connected with the output shaft 13 of the torque converter 1, 2) a pinion carrier 2b, and 3) a sun gear 2c connected with a transmission input shaft 14. The pinion carrier 2b is provided with: 1) a backward brake 2e for holding the pinion carrier 2b to a transmission case (not shown) and 2) a forward clutch 2d for integrally connecting the transmission input shaft 14 with the pinion carrier 2b.

The transmission input shaft 14 has an end section (left in FIG. 1) which is provided with a primary pulley 10 of the CVT 3. The CVT 3 is constituted of the primary pulley 10, a secondary pulley 40, a belt 15 for conveying a rotary force of the primary pulley 10 to the secondary pulley 40, and the like. The primary pulley 10 is constituted of: 1) a stationary pulley 14a rotatable integrally with the transmission input shaft 14 and 2) a movable pulley 12. The stationary pulley 14a and the movable pulley 12 opposed to each other form substantially a V-shaped pulley groove. The movable pulley 12 is movable in an axial direction of the transmission input shaft 14 by means of an oil pressure which acts on a primary pulley cylinder chamber 20 and a primary clamp chamber 30.

The secondary pulley 40 is disposed on the follower shaft 16. The secondary pulley 40 is constituted of: 1) a stationary pulley 16a rotatable integrally with the follower shaft 16 and 2) a movable pulley 42. The stationary pulley 16a and the movable pulley 42 opposed to each other form substantially a V-shaped pulley groove. The movable pulley 42 is movable in an axial direction of the follower shaft 16 by means of an oil pressure which acts on a secondary pulley cylinder chamber 60 and a secondary clamp chamber 50.

Figure 2:
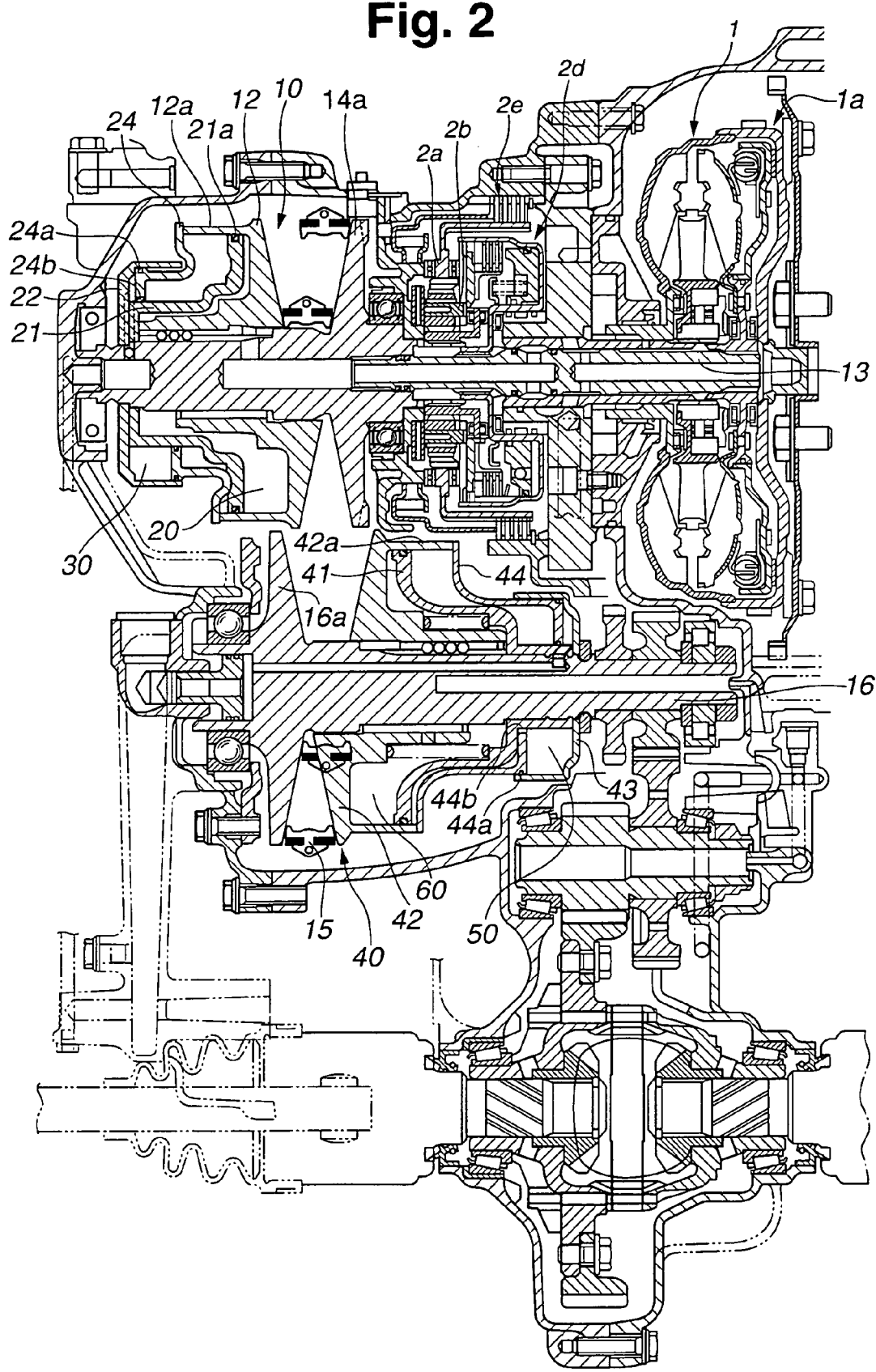
FIG. 2 is a cross sectional view of the belt-type continuously variable transmission, according to a first embodiment.

Hereinafter described is a constitution of a piston chamber of the primary pulley 10 and the secondary pulley 40, as is seen in FIG. 2.

The primary pulley cylinder chamber 20 is sectioned into 1) the movable pulley 12, 2) an extension section 12a of the movable pulley 12, and 3) a stationary wall 21. An inner peripheral section of the extension section 12a and an outer peripheral section of the stationary wall 21 are sealed with a seal 21a, thereby allowing the primary pulley cylinder chamber 20 to keep an oil-tightness even when the movable pulley 12 moves axially.

The primary clamp chamber 30 is sectioned into the stationary wall 21, a stationary wall 22 and a piston 24. The piston 24 has an outer diameter section abutting on the extension section 12a of the movable pulley 12. Moreover, a seal 24a and a seal 24b allow the primary clamp chamber 30 to keep the oil-tightness.

Likewise, the secondary pulley cylinder chamber 60 is sectioned into 1) the movable pulley 42, 2) an extension section 42a of the movable pulley 42, and 3) a stationary wall 41. An inner peripheral section of the extension section 42a and an outer peripheral section of the stationary wall 41 are sealed with a seal 41a, thereby allowing the secondary pulley cylinder chamber 60 to keep the oil-tightness even when the movable pulley 42 moves axially.

The secondary clamp chamber 50 is sectioned into the stationary wall 41, a stationary wall 43 and a piston 44. The piston 44 has an outer diameter section abutting on the extension section 42a of the movable pulley 42. Moreover, a seal 44a and a seal 44b allow the secondary clamp chamber 50 to keep the oil-tightness.

Figure 3:
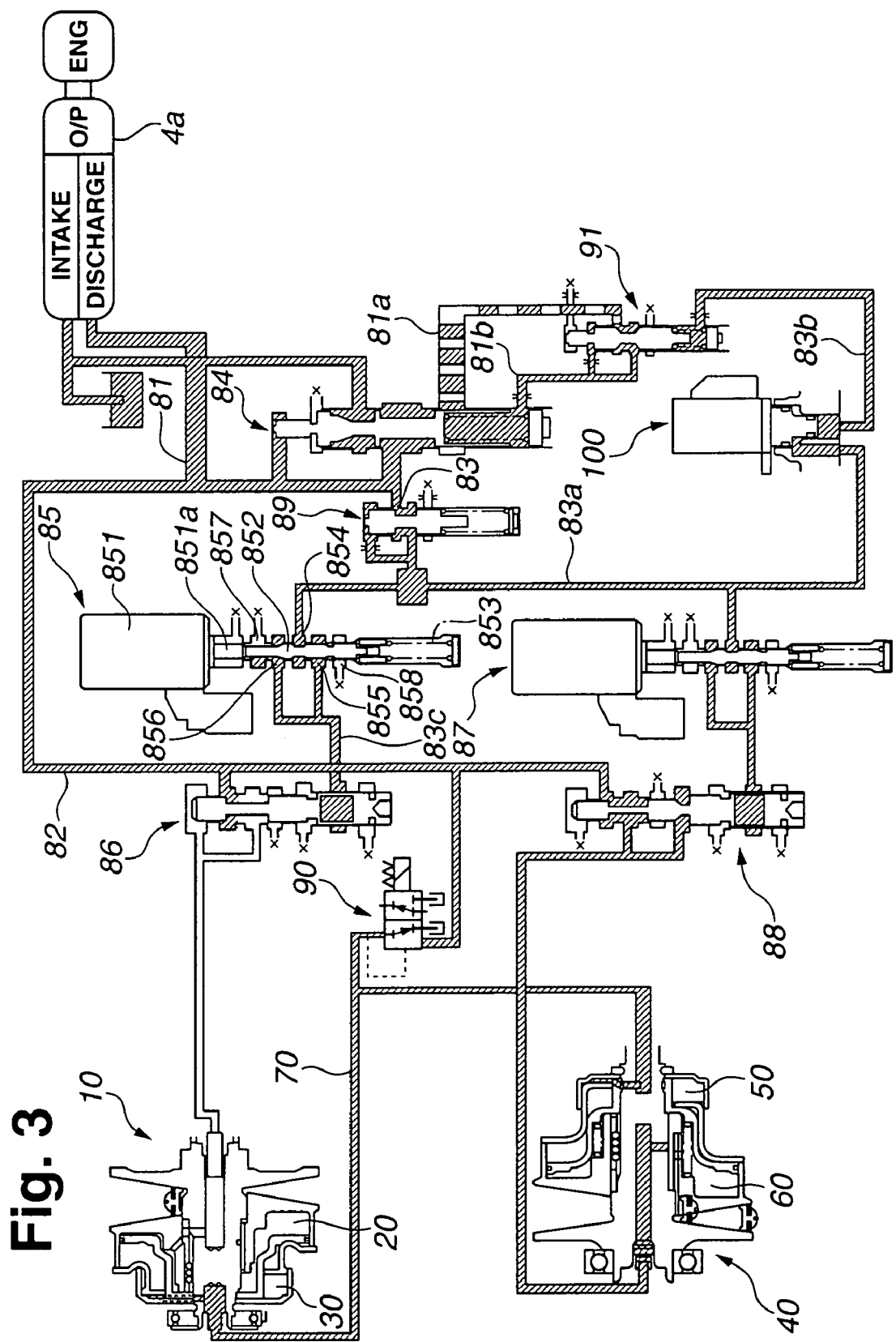
FIG. 3 shows a circuit diagram of an oil pressure circuit of the belt-type continuously variable transmission, according to the first embodiment of the present invention.

Herein, the primary clamp chamber 30 and the secondary clamp chamber 50 have substantially an equal applied pressure area Acl (otherwise, referred to as "cross section Acl"), and are communicated with each other by way of an oil passage 70 (see FIG. 3). Moreover, the primary pulley cylinder chamber 20 and the secondary pulley cylinder chamber 60 have substantially an equal applied pressure area Asft (otherwise, referred to as "cross section Asft").

The follower shaft 16 is fixed to a driving gear. By way of a pinion, a final gear and a differential device which are fitted to an idler shaft, the driving gear drives a drive shaft extending to a wheel (not shown).

In a power transmission with the above constitution, moving axially the movable pulley 12 of the primary pulley 10 and the movable pulley 42 of the secondary pulley 40 may change a radius in a position contacting the belt 15, thus changing a rotary ratio (namely, a gear change ratio) between the primary pulley 10 and the secondary pulley 40. A variation in width of the V-shaped pulley groove can be controlled by means of the oil pressure to the primary pulley cylinder chamber 20, the secondary pulley cylinder chamber 60, the primary clamp chamber 30 and the secondary clamp chamber 50 by way of the CVT control unit 5.

Signals inputted to the CVT control unit 5 includes: 1) a throttle valve opening TVO from the throttle opening sensor 8, 2) an in-transmission oil temperature T from the oil temperature sensor 9, 3) a primary speed Npri from the primary speed sensor 6, 4) a secondary speed Nsec from the secondary speed sensor 7, 5) a follower shaft torque from the torque sensor 51, and the like. Based on the thus inputted signals, the CVT control unit 5 may operate a control signal, thereby outputting the control signal to the oil pressure control valve unit 4.

The control signal thus inputted to the oil pressure control valve unit 4 from the CVT control unit 5 may drive a solenoid (not shown) in the oil pressure control valve unit 4, thus supplying a control oil pressure to each of the primary pulley cylinder chamber 20, the secondary pulley cylinder chamber 60, the primary clamp chamber 30 and the secondary clamp chamber 50. With the above operation, a transmission control is carried out.

FIG. 3 shows a circuit diagram of an oil pressure circuit of the belt-type continuously variable transmission, according to the first embodiment of the present invention.

There is provided a pressure regulator valve 84 for regulating an oil pressure as a line pressure, which oil pressure is discharged from an oil pump 4a and conveyed to the pressure regulator valve 84 by way of an oil passage 81. The oil passage 81 communicates to an oil passage 82 and an oil passage 83. The oil passage 82 is connected to a primary pulley control valve 86 and a secondary pulley control valve 88. The oil passage 83 is connected to a pilot valve 89 which supplies a source pressure of a signal pressure.

A relief pressure of the pressure regulator valve 84 may be supplied to a pressure modifier valve 91 by way of an oil passage 81a. An oil pressure of the pressure modifier valve 91 may be regulated by means of a signal pressure (with a pilot pressure as a source pressure) from a line pressure solenoid 100, thus acting as a back pressure of the pressure regulator valve 84, resulting in regulation of the line pressure.

The oil pressure regulated by means of the pilot valve 89 may be supplied to a gear change proportion control valve 85 on the primary pulley 10's side and a gear change proportion control valve 87 on the secondary pulley 40's side.

Described below is operation of the gear change proportion control valve 85 and the gear change proportion control valve 87. A fundamental operation is substantially the same between the primary pulley 10's side and the secondary pulley 40's side. Therefore, described below is limited to the operation of the gear change proportion control valve 85 on the primary pulley 10's side.

There is provided a solenoid 851 for operating a spool driving shaft 851a in proportion to a current instruction from the CVT control unit 5. There is provided a spool 852 for switching the oil passage. Moreover, below the spool 852 in FIG. 3, there is provided a spring 853 for bringing about a biasing force toward (upper in FIG. 3) the spool driving shaft 851a. A cylinder housing therein the spool 852 is formed with: 1) an input port 854 to which the signal pressure form the pilot valve 89 is inputted, 2) a port 855 communicating with an oil passage 83c for supplying the oil pressure to the primary pulley control valve 86, 3) a port 856 to which a feedback pressure of the oil passage 83c is inputted, 4) a drain port 857 and 5) a drain port 858.

A drainage amount can be determined by means of a balancing caused by the following three biasing forces applied to the spool 852:

1) A downward biasing force by means of the solenoid 851.

2) A downward biasing force by means of a feedback pressure supplied from the port 856.

3) The upward biasing force by means of the spring 853.

The thus determined drainage amount can determine a back pressure of the primary pulley control valve 86.

The oil pressure controlled by means of the gear change proportion control valve 85 and the gear change proportion control valve 87 may be respectively supplied as a back pressure of the primary pulley control valve 86 and the secondary pulley control valve 88 by way of the oil passage 83c. The primary pulley control valve 86 may control the line pressure supplied from the pressure regulator valve 84, supplying the oil pressure (for gear change) to the primary pulley cylinder chamber 20. Likewise, the secondary pulley control valve 88 may control the line pressure supplied from the pressure regulator valve 84, supplying the oil pressure (for gear change) to the secondary pulley cylinder chamber 60.

The oil passage 70 communicating the primary clamp chamber 30 with the secondary clamp chamber 50 is connected to the oil passage 82. Between the oil passage 82 and the oil passage 70, there is provided a decompression valve 90 (otherwise, referred to as "clamping force setting valve") which can be operated with an electronic control. The oil passage 70 and the decompression valve 90 can reduce the line pressure based on an instruction signal from the CVT control unit 5, thus supplying the line pressure as a clamp pressure of the primary pulley 10 and the secondary pulley 40.

(Gear Change Control)

Described below is setting of the oil pressure of the following chambers: the primary pulley cylinder chamber 20, the secondary pulley cylinder chamber 60, the primary clamp chamber 30 and the secondary clamp chamber 50.

Figure 4:
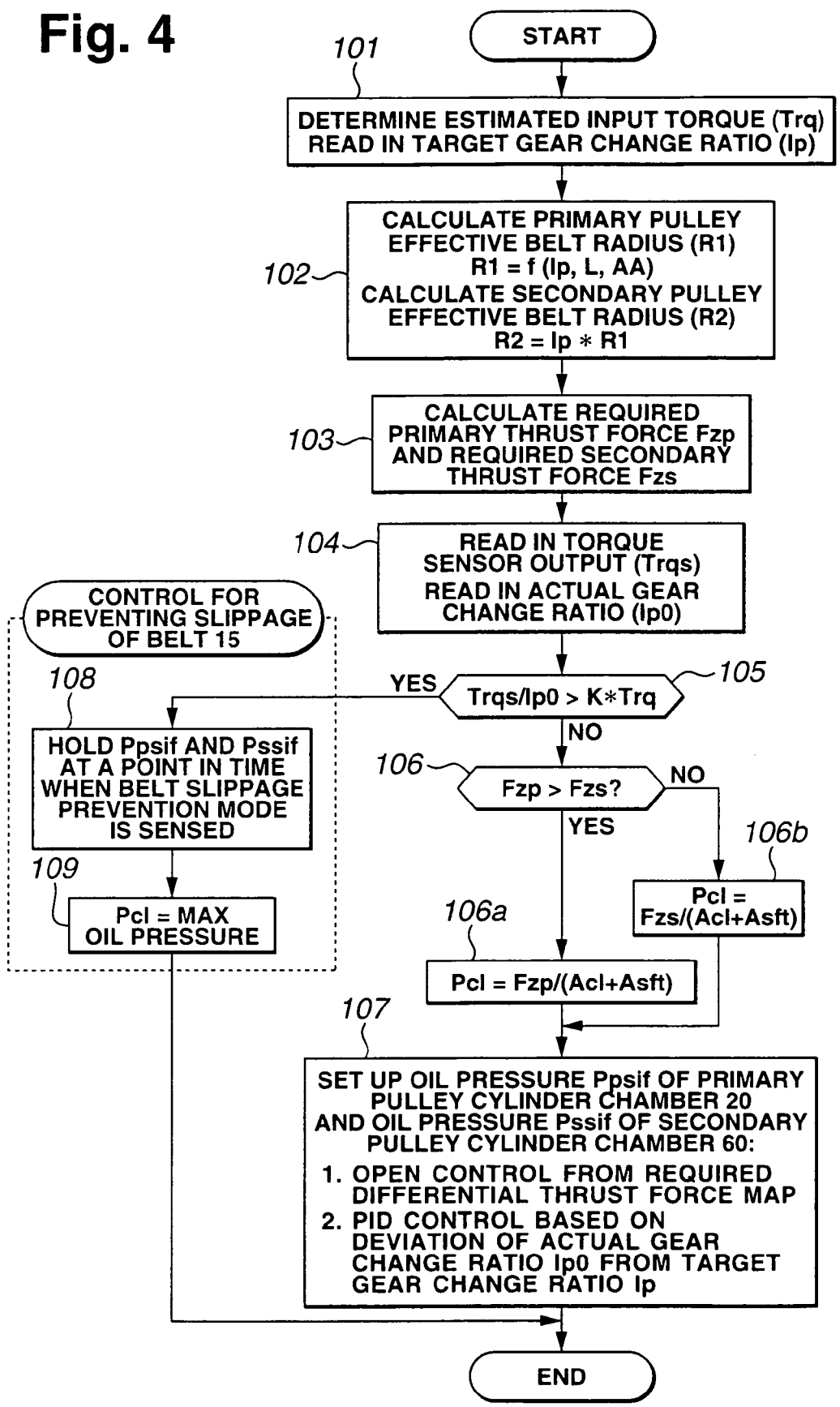
FIG. 4 shows a flowchart showing a gear change control of the belt-type continuously variable transmission, according to the first embodiment of the present invention.

FIG. 4 shows a flowchart of pressure setting control of the primary pulley cylinder chamber 20, the secondary pulley cylinder chamber 60, the primary clamp chamber 30 and the secondary clamp chamber 50.

[Step 101]

A routine may determine an estimated input torque Trq from an engine speed and the throttle valve opening TVO, and read in a target gear change ratio Ip from a gear change map.

[Step 102]

By the following expression (1), the routine may calculate a primary pulley effective belt radius R1 and a secondary pulley effective belt radius R2 at the target gear change ratio Ip:

$$R1 = f(Ip, L, AA) \qquad \text{Equation (1)}$$

where f is a function of the primary pulley effective belt radius R1 with parameters including the target gear change ratio Ip, a peripheral length L of the belt 15, and an inter-axial length AA.

$$R2 = Ip \cdot R1 \qquad \text{Equation (2)}$$

[Step 103]

Based on a thrust force balancing equation, the routine may calculate a required primary thrust force Fzp and a required secondary thrust force Fzs at the target gear change ratio Ip.

[Step 104]

The routine may read in a torque sensor output Trqs (otherwise, referred to as "torque sensor value" or "output torque") and an actual gear change ratio Ip0.

[Step 105]

The routine may determine whether a converted input torque Trqs/Ip0 is over a certain numeral K times (for example, 1.2 to 1.5) the estimated input torque Trq.

Case 1) If YES at step 105, the routine may determine that an abnormal torque is inputted from the output shaft 13's side. Then, the routine may move to a subsequent step 108 for carrying out a control for preventing slippage of the belt 15. Step 108 is to be described afterward.

Case 2) If NO at step 105, the routine may move to a subsequent step 106.

[Step 106]

The routine may determine whether the primary thrust force Fzp (calculated at step 103) is over the secondary thrust force Fzs (calculated at step 103).

Case 1) If YES at step 106, the routine may move to a subsequent sub-step 106a.

Case 2) If NO at step 106, the routine may move to a subsequent sub-step 106b.

[Sub-step 106a]

The routine may set up a clamp chamber oil pressure Pcl by the following calculation:

dividing the primary thrust force Fzp by an addition of:
the applied pressure area Acl of the double piston, and
the applied pressure area Asft of the double piston.

With this, the routine can control the oil pressure by means of the decompression valve 90 (see FIG. 3).

[Sub-step 106b]

The routine may set up the clamp chamber oil pressure Pcl by the following calculation:

dividing the secondary thrust force Fzs by the addition of:
the applied pressure area Acl of the double piston, and
the applied pressure area Asft of the double piston.

With this, the routine can control the oil pressure by means of the decompression valve 90 (see FIG. 3).

[Step 107]

From a differential thrust force map in FIG. 5, the routine may determine an oil pressure Ppsif of the primary pulley cylinder chamber 20 and an oil pressure Pssif of the secondary pulley cylinder chamber 60, thus carrying out an open control. With a deviation of the actual gear change ratio Ip0 from the target gear change ratio Ip within a certain value, the routine may carry out a PID control based on the deviation of the actual gear change ratio Ip0 from the target gear change ratio Ip.

(Control for preventing slippage of belt 15)

[Step 108]

The routine may hold the oil pressure Ppsif of the primary pulley cylinder chamber 20 and the oil pressure Pssif of the secondary pulley cylinder chamber 60 which oil pressures Ppsif and Pssif were obtained at the point in time when the routine moved to the control for preventing slippage of the belt 15, thus holding the gear change ratio.

[Step 109]

By means of the decompression valve 90, the routine may maximize the clamp chamber oil pressure Pcl of the primary clamp chamber 30 and the clamp chamber oil pressure Pcl of the secondary clamp chamber 50. Moreover, the routine may maximize the line pressure by outputting a maximum pressure instruction to the line pressure solenoid 100.

As described above, when the abnormal torque from the output shaft 13's side is so sensed as to cause the likely slippage of the belt 15, the routine may hold the oil pressure Ppsif of the primary pulley cylinder chamber 20 and the oil pressure Pssif of the secondary pulley cylinder chamber 60, with only the clamp chamber oil pressure Pcl maximized. With this, the slippage of the belt 15 can be assuredly prevented.

Otherwise, the following operation is allowed:

With the clamp chamber oil pressure Pcl maximized, increase the oil pressure Ppsif of the primary pulley cylinder chamber 20 and the oil pressure Pssif of the secondary pulley cylinder chamber 60 to such an extent that the gear change ratio is not varied.

(Logic of setting up clamp chamber oil pressure Pcl)

Described below is setting of the clamp chamber oil pressure Pcl. According to the first embodiment, the primary clamp chamber 30 and the secondary clamp chamber 50 have substantially the equal applied pressure area Acl (cross section Acl), and are communicated with each other by way of the oil passage 70 (see FIG. 3). Moreover, according to the first embodiment, the primary pulley cylinder chamber 20 and the secondary pulley cylinder chamber 60 have substantially the equal applied pressure area Asft (cross section Asft).

Herein, the primary thrust force Fzp is defined as a force that is required for the movable pulley 12 on the primary side, while the secondary thrust force Fzs is defined as a force that is required for the movable pulley 42 on the secondary side. The clamp chamber oil pressure Pcl is defined as an oil pressure that is inputted to the primary clamp chamber 30 and the secondary clamp chamber 50. Also defined are an oil pressure Pp that is inputted to the primary pulley cylinder chamber 20, and an oil pressure Ps that is inputted to the secondary pulley cylinder chamber 60.

The required primary thrust force Fzp and the required secondary thrust force Fzs may be given respectively by the following equation (3) and equation (4):

$$Fzp = Pp \cdot Asft + Pcl \cdot Acl \qquad \text{Equation (3)}$$

$$Fzs = Ps \cdot Asft + Pcl \cdot Acl \qquad \text{Equation (4)}$$

Hereinabove, the applied pressure area Asft and the applied pressure area Acl are fixed, while the oil pressure Pp, the oil pressure Ps and the clamp chamber oil pressure Pcl are parameters (oil pressure to be set up). For holding the gear change ratio with a discharge oil pressure from the oil pump 4a kept low, a maximum oil pressure among the oil pressure Pp, the oil pressure Ps and the clamp chamber oil pressure Pcl is to be minimized. The primary thrust force Fzp and the secondary thrust force Fzs have substantially the equal clamp chamber oil pressure Pcl. After all, it is an element of a difference between the oil pressure Pp and the oil pressure Ps that may determine the differential thrust force.

Herein, changing the equation (3) and the equation (4) with Pp·Asft=Yp, Ps·Asft=Ys, and Pcl·Acl=X may bring about the following equation (5) and equation (6):

$$Yp = -X + Fzp \qquad \text{Equation (5)}$$

$$Ys = -X + Fzs \qquad \text{Equation (6)}$$

Figure 9:
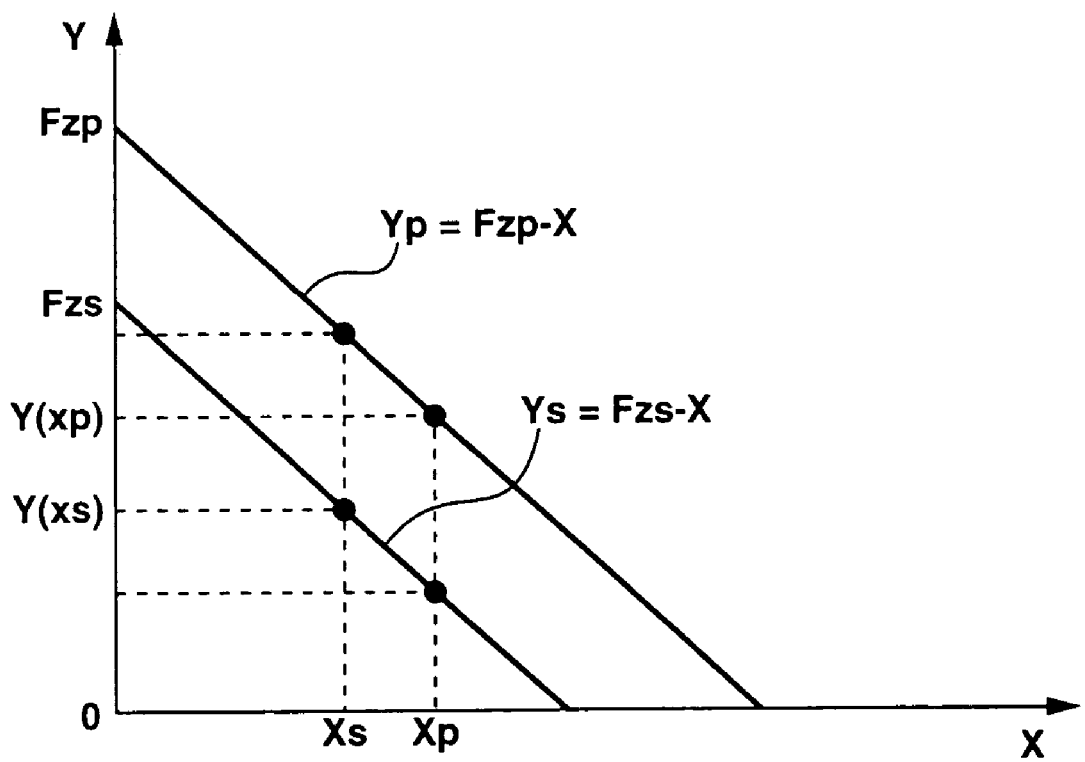
FIG. 9 shows a relation between the clamp chamber oil pressure relative to the cylinder chamber oil pressure under a logic of setting up clamp chamber oil pressure Pcl, according to the embodiment of the present invention.

A first assumption is made such that Fzp>Fzs. FIG. 9 shows a relation between X and Y.

Case 1) Paying attention to the secondary thrust force Fzs (smaller):

For substantially minimizing the maximum oil pressure among the oil pressure Ps and the clamp chamber oil pressure Pcl, Ps =Pcl is preferred. Herein defined is X=Xs. In this case, since Pp>Ps as is obvious from FIG. 9, the oil pressure Pp only may be maximized. In other words, maximizing one kind (oil pressure Pp) out of the three kinds (oil pressure Pp, oil pressure Ps, and clamp chamber oil pressure Pcl).

Case 2) Paying attention to the primary thrust force Fzp (greater):

For substantially minimizing the maximum oil pressure among the oil pressure Pp and the clamp chamber oil pressure Pcl, Pp=Pcl is preferred. Herein defined is X=Xp. In this case, since Pp>Ps as is obvious from FIG. 9 and the oil pressure Ps is smaller than Xp, the oil pressure Pp and the clamp chamber oil pressure Pcl may be maximized. In other words, maximizing two kinds (oil pressure Pp and clamp chamber oil pressure Pcl) out of the three kinds (oil pressure Pp, oil pressure Ps, and clamp chamber oil pressure Pcl) can meet the minimizing of the maximum.

With the above, the clamp chamber oil pressure Pcl can be calculated by the following equation (7):

$$Pcl = Fzp/(Asft + Acl) \qquad \text{Equation (7)}$$

A second assumption is made such that Fzp<Fzs. In this case, the following equation (8) is made:

$$Pcl = Fzs/(Asft + Acl) \qquad \text{Equation (8)}$$

Summarizing the above, based on the greater one of the primary thrust force Fzp and the secondary thrust force Fzs, the oil pressure Pp of the primary pulley cylinder chamber 20, the oil pressure Ps of the secondary pulley cylinder chamber 60, the clamp chamber oil pressure Pcl of the primary clamp chamber 30 and the clamp chamber oil pressure Pcl of the secondary clamp chamber 50 are substantially equalized, thereby minimizing the maximum oil pressure of the three kinds (oil pressure Pp, oil pressure Ps, clamp chamber oil pressure Pcl). With this, a load on the oil pump 4a can be reduced, thus reducing fuel consumption.

With a gear change instruction outputted, the routine may calculate the primary thrust force Fzp and the secondary thrust force Fzs that are required after the target gear change ratio Ip is achieved, thus setting up the clamp chamber oil pressure Pcl corresponding to the thus calculated primary thrust force Fzp and secondary thrust force Fzs. Substantially simultaneously with this, calculating the differential thrust force (required for the gear change) referring to the differential thrust force map and PID controlling the oil pressure Pp of the primary pulley cylinder chamber 20 and the oil pressure Ps of the secondary pulley cylinder chamber 60 can achieve the gear change at a low oil pressure.

FIG. 6 shows a variation in the primary pulley oil pressure and the secondary pulley oil pressure at the gear change, comparing a related art {FIG. 6(a)} with the first embodiment of the present invention {FIG. 6(b)}.

More specifically, FIG. 6(a) according to the related art shows a variation in the oil pressure by controlling the primary pulley oil pressure and the secondary pulley oil pressure with one oil pressure chamber.

On the other hand, FIG. 6(b) according to the first embodiment of the present invention shows a variation in the oil pressure by controlling with a double piston including the primary clamp chamber 30 and the secondary clamp chamber 50.

As is seen in FIG. 6(a), making the gear change from an over drive (OD) state to substantially a lowest state with the one oil pressure chamber according to the related art is, due to its small applied pressure area, in need for making the secondary pulley oil pressure considerably high, so as to cause the differential thrust force with a clamp oil pressure secured.

Contrary to the above, as is seen in FIG. 6(a), providing the primary clamp chamber 30 and the secondary clamp chamber 50 according to the first embodiment of the present invention can secure the applied pressure areas Acl, Acl. Moreover, setting up the clamp chamber oil pressure Pcl based on the above "(Logic of setting up clamp chamber oil pressure Pcl)" can secure the thrust force at the low oil pressure.

As described above, the control system of the continuously variable transmission according to the first embodiment has the double piston constitution including the primary clamp chamber 30, the secondary clamp chamber 50, the primary pulley cylinder chamber 20 and the secondary pulley cylinder chamber 60, thus securing the applied pressure areas Acl and Asft, resulting in achievement of the gear change control at the low oil pressure.

Moreover, setting up the clamp chamber oil pressure Pcl involves the calculation of the primary thrust force Fzp and the second thrust force Fzs. Then, the greater one of the primary thrust force Fzp and the secondary thrust force Fzs is to be divided by the addition of the applied pressure area Acl and the applied pressure area Asft, thereby setting up the minimum value for maximizing each of the oil pressure Pp, the oil pressure Ps and the clamp chamber oil pressure Pcl, resulting in achievement of the gear change control at the low oil pressure.

If the converted input torque Trqs/Ip0 is over the certain numeral K times (for example. 1.2 to 1.5) the estimated input torque Trq, maximizing the clamp chamber oil pressure Pcl can assuredly prevent the slippage of the belt 15 even when the abnormal torque is inputted.

1) Setting up the clamp chamber oil pressure Pcl based on the thrust force Fzp, Fzs which is obtained when the target gear change ratio Ip is achieved and 2) causing a differential pressure (which is capable of causing the differential thrust force) by means of the primary pulley cylinder chamber 20 and the secondary pulley cylinder chamber 60 can secure the differential pressure between the primary pulley cylinder chamber 20 and the secondary pulley cylinder chamber 60 at the lower oil pressure, with the oil consumption (flow rate) of the primary clamp chamber 30 and the secondary clamp chamber 50 30 extremely reduced at the gear change. Thereby, the double piston according to the first embodiment of the present invention can be made substantially equal to the single piston according to the related art in terms of the oil consumption (flow rate), and can achieve a quick gear change control.

Second Embodiment

Figure 7:
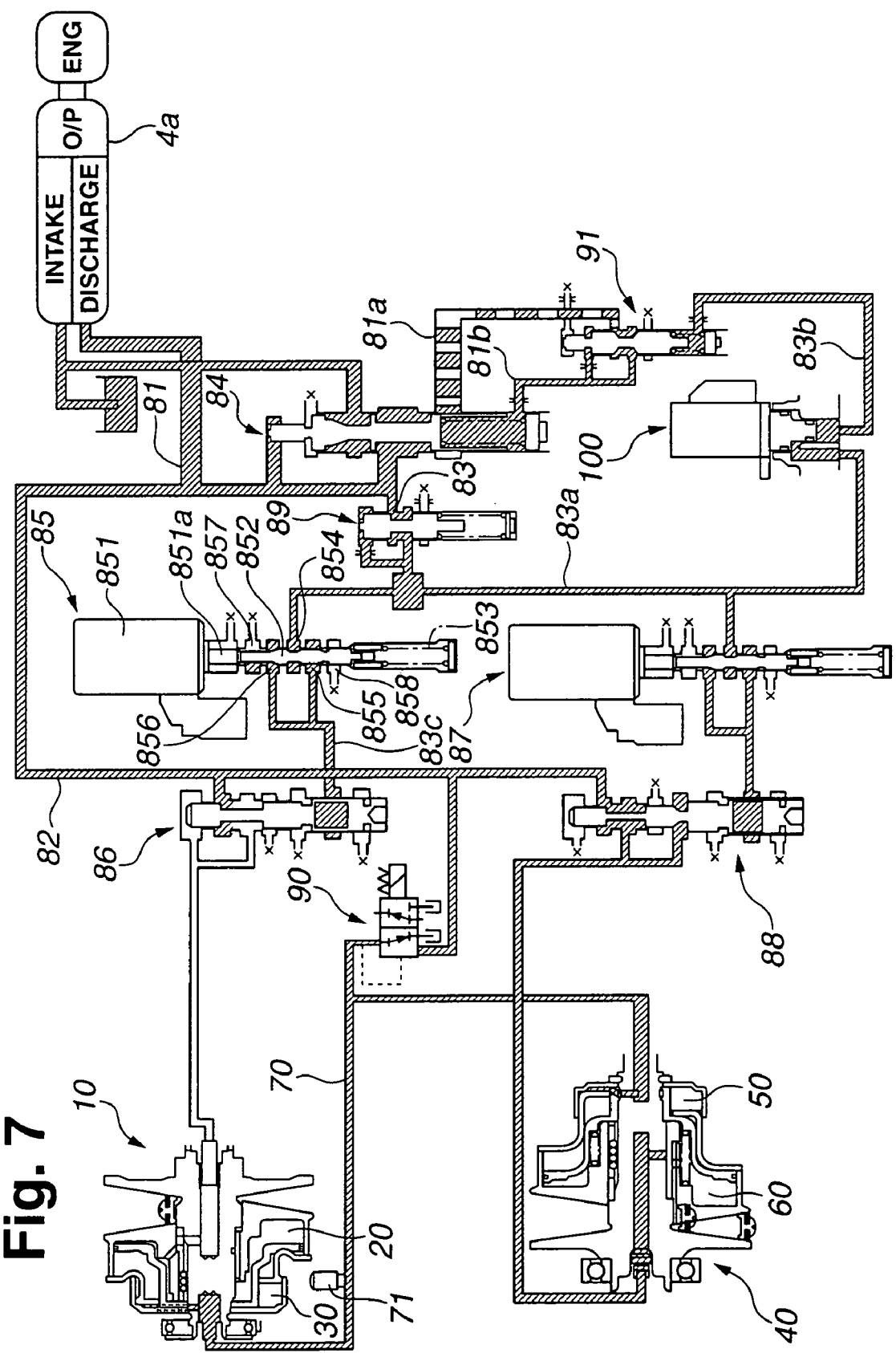
FIG. 7 shows a circuit diagram of the oil pressure circuit of the belt-type continuously variable transmission, according to a second embodiment of the present invention.

FIG. 7 shows a circuit diagram of the oil pressure circuit of the belt-type continuously variable transmission, according to a second embodiment of the present invention.

The fundamental constitution according to the second embodiment is substantially the same as that according to the first embodiment. Therefore, described below are different points, and thereby repeated description is to be omitted.

In FIG. 7, the oil passage 70 communicating the primary clamp chamber 30 with the secondary clamp chamber 50 is fitted with an oil pressure sensor 71 for sensing the clamp chamber oil pressure Pcl which is an actual clamp oil pressure Pcl.

Figure 8:
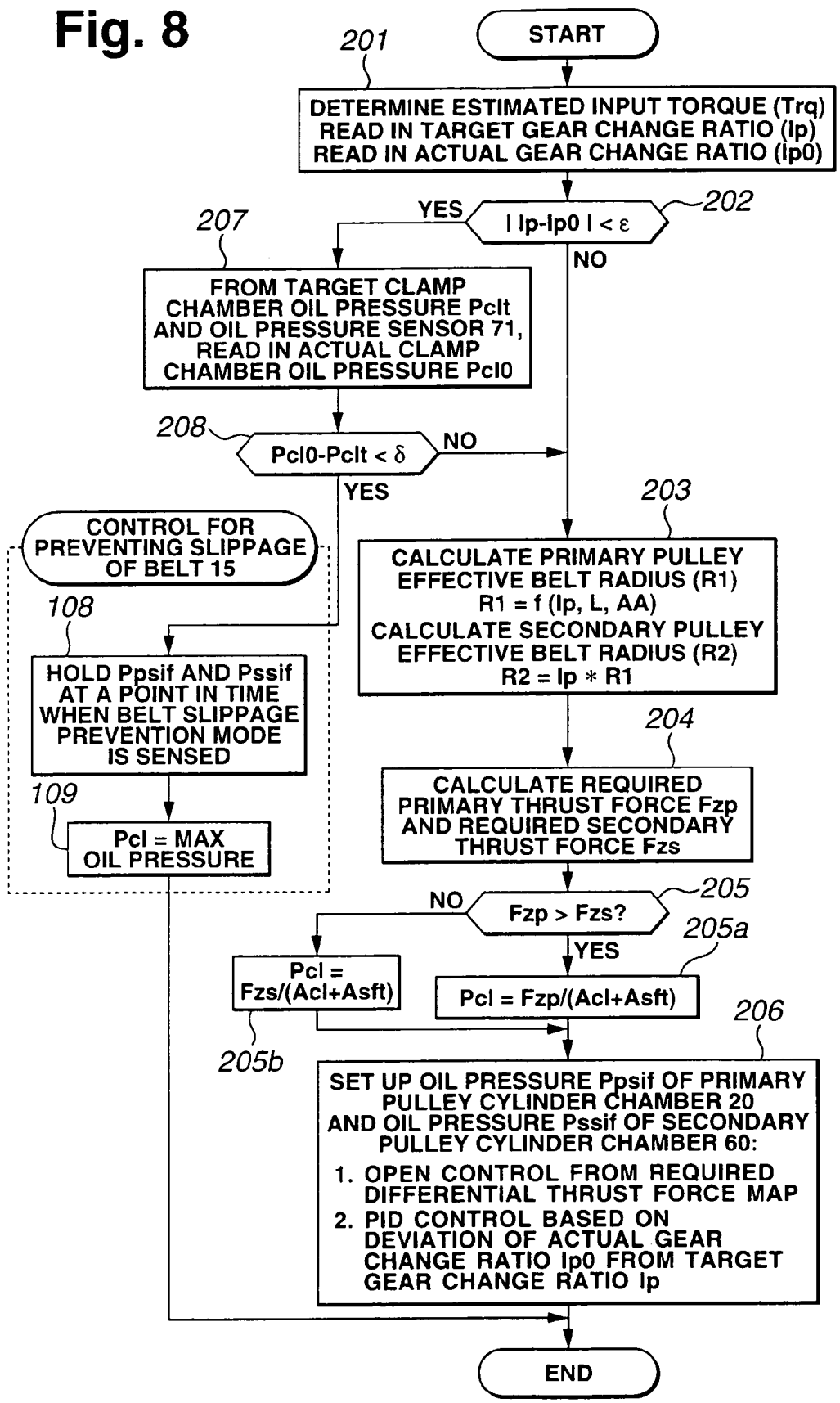
FIG. 8 shows a flowchart showing the gear change control of the belt-type continuously variable transmission, according to the second embodiment of the present invention.

FIG. 8 shows a flowchart of the pressure setting control of each of the primary pulley cylinder chamber 20, the secondary pulley cylinder chamber 60, the primary clamp chamber 30 and the secondary clamp chamber 50.

[Step 201]

The routine may determine the estimated input torque Trq from the engine speed and the throttle valve opening TVO, and read in the target gear change ratio Ip from the gear change map. Moreover, the routine may read in the actual gear change ratio Ip0 from the primary speed Npri and a secondary speed Nsec.

[Step 202]

The routine may determine whether an absolute valve of the deviation of the actual gear change ratio Ip0 from the target gear change ratio Ip |Ip−Ip0| is below a predetermined value ϵ.

Case 1) If YES at step 202, the routine may move to a subsequent step 207.

Case 2) If NO at step 202, the routine may move to a subsequent step 203.

[Step 203]

By the following equation (9), the routine may calculate the primary pulley effective belt radius R1 and the secondary pulley effective belt radius R2 at the target gear change ratio Ip:

$$R1 = f(Ip, L, AA) \qquad \text{Equation (9)}$$

where f is the function of the primary pulley effective belt radius R1 with parameters including the target gear change ratio Ip, the peripheral length L of the belt 15, and the inter-axial length AA.

$$R2 = Ip \cdot R1 \qquad \text{Equation (10)}$$

[Step 204]

Based on the thrust force balancing equation, the routine may calculate the required primary thrust force Fzp and the required secondary thrust force Fzs at the target gear change ratio Ip.

[Step 205]

The routine may determine whether the primary thrust force Fzp (calculated at step 204) is over the secondary thrust force Fzs (calculated at step 204).

Case 1) If YES at step 205, the routine may move to a subsequent sub-step 205a.

Case 2) If NO at step 205, the routine may move to a subsequent sub-step 205b.

[Sub-step 205a]

The routine may set up the clamp chamber oil pressure Pcl by the following calculation:
    dividing the primary thrust force Fzp by the addition of:
        the applied pressure area Acl of the double piston, and
        the applied pressure area Asft of the double piston.

With this, the routine can control the oil pressure by means of the decompression valve 90 (see FIG. 7).

[Sub-step 205b]

The routine may set up the clamp chamber oil pressure Pcl by the following calculation:

dividing the secondary thrust force Fzs by the addition of:
the applied pressure area Acl of the double piston, and
the applied pressure area Asft of the double piston.

With this, the routine can control the oil pressure by means of the decompression valve 90 (see FIG. 7).

[Step 206]

From the differential thrust force map in FIG. 5, the routine may set up the oil pressure Ppsif of the primary pulley cylinder chamber 20 and the oil pressure Pssif of the secondary pulley cylinder chamber 60, thus carrying out the open control. With the deviation of the actual gear change ratio Ip0 from the target gear change ratio Ip within the certain value, the routine may carry out the PID control based on the deviation of the actual gear change ratio Ip0 from the target gear change ratio Ip.

[Step 207]

From a target clamp chamber oil pressure Pclt (operated at step 205) and the oil pressure sensor 71 (see FIG. 7), the routine may read in an actual clamp chamber oil pressure Pcl0.

[Step 208]

The routine may determine whether a deviation of the actual clamp chamber oil pressure Pcl0 from the target clamp chamber oil pressure Pclt is over a predetermined value δ.

Case 1) If YES at step 208, the routine may move to the subsequent step 108 for carrying out the control for preventing slippage of the belt 15.

Case 2) If NO at step 208, the routine may move to the subsequent step 203 for carrying out the ordinary gear change control.

When the deviation of the target gear change ratio Ip from the actual gear change ratio Ip0 is below the predetermined value ε, the routine may determine that a stationary state is obtained with the gear change ratio stabilized. In this case, the routine may determine whether the deviation of the actual clamp chamber oil pressure Pcl0 (sensed with the oil pressure sensor 71) from the target clamp chamber oil pressure Pclt is over the predetermined value η. Herein, the primary clamp chamber 30 and the secondary clamp chamber 50 communicated by means of the oil passage 70 are high in oil pressure rigidity. A great disturbance inputted may cause a peaky oil pressure change. Sensing the thus caused peaky oil pressure change by means of the oil pressure sensor 71 can determine whether the abnormal torque is inputted from the output shaft 13's side. In this case, maximizing the clamp chamber oil pressure Pcl can assuredly prevent the belt slippage.

Although the present invention has been described above by reference to a certain embodiment, the present invention is not limited to the embodiment described above. Modifications and variations of the embodiment described above will occur to those skilled in the art, in light of the above teachings.

This application is based on a prior Japanese Patent Application No. P2003-119358 (filed on Apr. 24, 2003 in Japan). The entire contents of the Japanese Patent Application No. P2003-119358 from which priority is claimed is incorporated herein by reference, in order to take some protection against mis-translation or omitted portions.

The scope of the present invention is defined with reference to the following claims.

What is claimed is:

1. A gear change control system of a belt-type continuously variable transmission, comprising:

I) a movable pulley piston chamber for causing a thrust force to a movable pulley which varies a groove width of each of a primary pulley and a secondary pulley, the movable pulley piston chamber having a double-piston constitution including:
   a) a clamp chamber including a primary clamp chamber and a secondary clamp chamber, for causing a clamp force for clamping a belt, and
   b) a cylinder chamber including a primary pulley cylinder chamber and a secondary pulley cylinder chamber, for causing a differential thrust force at a gear change;

II) a communication passage communicating the primary clamp chamber with the secondary clamp chamber, a clamp chamber's applied pressure area on a primary side being substantially equal to a clamp chamber's applied pressure area on a secondary side;

III) a gear change control valve for controlling an oil pressure of the cylinder chamber;

IV) a clamping force setting valve disposed between an oil pressure source and the communication passage, the clamping force setting valve setting an oil pressure of the clamp chamber; and V) a gear change control section for achieving a certain gear change ratio by outputting an instruction signal to the gear change control valve and the clamping force setting valve in accordance with a sensed traveling state, the gear change control section including:
   a) a primary thrust force calculating section for calculating a primary thrust force of the movable pulley on the primary side,
   b) a secondary thrust force calculating section for calculating a secondary thrust force of the movable pulley on the secondary side,
   c) a thrust force selecting section for selecting one of the primary thrust force and the secondary thrust force that is greater than the other, and
   d) a clamp chamber oil pressure setting section for setting up a clamp chamber oil pressure by a following calculation:
      dividing the selected one of the primary thrust force and the secondary thrust force by an addition of:
      the clamp chamber's applied pressure area of one of the primary clamp chamber and the secondary clamp chamber, and
      a cylinder chamber's applied pressure area of the cylinder chamber on a selected side.

2. The gear change control system of the belt-type continuously variable transmission, as claimed in claim 1, wherein the gear change control system further comprises:

I) an output torque sensing section for sensing an output torque of the belt-type continuously variable transmission, II) an input torque converting section for obtaining a converted input torque from the sensed output torque, and III) an input torque estimating section for obtaining an estimated input torque, and wherein when the converted input torque is over the estimated input torque, the clamp chamber oil pressure is set to be substantially maximized.

3. The gear change control system of the belt-type continuously variable transmission, as claimed in claim 2, wherein, when the converted input torque is over a certain numeral times the estimated input torque, the clamp chamber oil pressure is set to be substantially maximized.

4. The gear change control system of the belt-type continuously variable transmission, as claimed in claim 3, wherein the certain numeral is in a range from 1.2 to 1.5.

5. The gear change control system of the belt-type continuously variable transmission, as claimed in claim 1,
wherein the communication passage has an oil pressure sensor for sensing the oil pressure, and
wherein, when a sensed actual clamp chamber oil pressure is greater than a clamp chamber setting oil pressure by a predetermined value, the clamp chamber oil pressure is set to be substantially maximized.

6. The gear change control system of the belt-type continuously variable transmission, as claimed in claim 5, wherein the clamp chamber setting oil pressure is a target clamp chamber oil pressure.

7. The gear change control system of the belt-type continuously variable transmission, as claimed in claim 1,
wherein the gear change control system further comprises:
I) an actual gear ratio sensing section for sensing an actual gear change ratio, and
II) a differential thrust force calculating section for calculating a deviation of the sensed actual gear change ratio from a target gear change ratio, and for calculating the differential thrust force between the primary thrust force and the secondary thrust force based on the calculated deviation, and
wherein with a gear change instruction outputted, the gear change control section allows the clamp chamber oil pressure setting section to set up the clamp chamber oil pressure based on the thrust force which is obtained when the target gear change ratio is reached, and
wherein a differential pressure capable of causing the calculated differential thrust force is caused by the cylinder chamber.

8. The gear change control system of the belt-type continuously variable transmission, as claimed in claim 1, wherein the primary pulley cylinder chamber and the secondary pulley cylinder chamber have substantially the equal cylinder chamber's applied pressure area.

9. The gear change control system of the belt-type continuously variable transmission, as claimed in claim 8, wherein the primary thrust force is a force for the movable pulley on the primary side, while the secondary thrust force is a force for the movable pulley on the secondary side,
wherein the clamp chamber oil pressure is an oil pressure that is inputted to the primary clamp chamber and the secondary clamp chamber, and
wherein a primary pulley cylinder chamber oil pressure is inputted to the primary pulley cylinder chamber, and a secondary pulley cylinder chamber oil pressure is inputted to the secondary pulley cylinder chamber.

10. The gear change control system of the belt-type continuously variable transmission, as claimed in claim 9, wherein the primary thrust force and the secondary thrust force are given respectively by the following equation (A) and equation (B):

$$Fzp = Pp \cdot Asft + Pcl \cdot Acl \qquad \text{Equation (A)}$$

$$Fzs = Ps \cdot Asft + Pcl \cdot Acl \qquad \text{Equation (B)}$$

where: Fzp is the primary thrust force,
Fzs is the secondary thrust force,
Pp is the primary pulley cylinder chamber oil pressure,
Ps is the secondary pulley cylinder chamber oil pressure,
Pcl is the clamp chamber oil pressure,
Asft is the cylinder chamber's applied pressure area of any one of the primary pulley cylinder chamber and the secondary pulley cylinder chamber, and
Acl is the clamp chamber's applied pressure area of any one of the primary clamp chamber and the secondary clamp chamber,
wherein the cylinder chamber's applied pressure area and the clamp chamber's applied pressure area are substantially fixed, while the primary pulley cylinder chamber oil pressure, the secondary pulley cylinder chamber oil pressure and the clamp chamber oil pressure are parameters,
wherein, for holding the certain gear change ratio with a discharge oil pressure from the oil pressure source low, substantially a maximum oil pressure among the primary pulley cylinder chamber oil pressure, the secondary pulley cylinder chamber oil pressure and the clamp chamber oil pressure is to be substantially minimized, and
wherein the primary thrust force and the secondary thrust force have substantially the equal clamp chamber oil pressure such that, an element of a difference between the primary pulley cylinder chamber oil pressure and the secondary pulley cylinder chamber oil pressure determines the differential thrust force.

11. The gear change control system of the belt-type continuously variable transmission, as claimed in claim 10, wherein changing the equation (A) and the equation (B) with Pp·Asft=Yp, Ps·Asft=Ys, and Pcl·Acl=X brings about the following equation (C) and equation (D):

$$Yp = -X + Fzp \qquad \text{Equation (C)}$$

$$Ys = -X + Fzs \qquad \text{Equation (D),}$$

a first assumption is made such that Fzp>Fzs, making the following case 1) and case 2):
case 1) in which the secondary thrust force which is the smaller thrust force is paid attention to:
for substantially minimizing the maximum oil pressure among the secondary pulley cylinder chamber oil pressure and the clamp chamber oil pressure, Ps=Pcl is determined, and X=Xs herein is defined,
since Pp>Ps, the primary pulley cylinder chamber oil pressure is maximized, thereby, maximizing one oil pressure out of a group consisting of the primary pulley cylinder chamber oil pressure, the secondary pulley cylinder chamber oil pressure and the clamp chamber oil pressure,
case 2) in which the primary thrust force which is the greater thrust force is paid attention to:
for substantially minimizing the maximum oil pressure among the primary pulley cylinder chamber oil pressure and the clamp chamber oil pressure, Pp=Pcl is determined, and X=Xp herein is defined,
since Pp<Ps and the secondary pulley cylinder chamber oil pressure is smaller than Xp, the primary pulley cylinder chamber oil pressure and the clamp chamber oil pressure are maximized, thereby maximizing two kinds of oil pressures out of the group consisting of the primary pulley cylinder chamber oil pressure, the secondary pulley cylinder chamber oil pressure and the clamp chamber oil pressure, and
the clamp chamber oil pressure is thereby calculated by the following equation (E):

$$Pcl = Fzp/(Asft + Acl) \qquad \text{Equation (E).}$$

12. The gear change control system of the belt-type continuously variable transmission, as claimed in claim 11, wherein, when a second assumption is made such that Fzp<Fzs, the clamp chamber oil pressure is calculated by the following equation (F):

$$Pcl = Fzs/(Asft + Acl) \qquad \text{Equation (F).}$$

13. The gear change control system of the belt-type continuously variable transmission, as claimed in claim 12, wherein based on the greater one of the primary thrust force and the secondary thrust force, the primary pulley cylinder chamber oil pressure of the primary pulley cylinder chamber, the secondary pulley cylinder chamber oil pressure of the secondary pulley cylinder chamber, the clamp chamber oil pressure of the primary clamp chamber and the clamp chamber oil pressure of the secondary clamp chamber are substantially equalized, thereby minimizing the maximum oil pressure of the group consisting of the primary pulley cylinder chamber oil pressure, the secondary pulley cylinder chamber oil pressure and the clamp chamber oil pressure.

14. The gear change control system of the belt-type continuously variable transmission, as claimed in claim 10, wherein the oil pressure source is an oil pump.

15. A gear change control method of a belt-type continuously variable transmission which includes: I) a movable pulley piston chamber for causing a thrust force to a movable pulley which varies a groove width of each of a primary pulley and a secondary pulley, the pulley piston chamber having a double-piston constitution including: a) a clamp chamber including a primary clamp chamber and a secondary clamp chamber, for causing a clamp force for clamping a belt, and b) a cylinder chamber including a primary pulley cylinder chamber and a secondary pulley cylinder chamber, for causing a differential thrust force at a gear change; II) a communication passage communicating the primary clamp chamber with the secondary clamp chamber, a clamp chamber's applied pressure area on a primary side being substantially equal to a clamp chamber's applied pressure area on a secondary side; III) a gear change control valve for controlling an oil pressure of the cylinder chamber; IV) a clamping force setting valve disposed between an oil pressure source and the communication passage, the clamping force setting valve setting an oil pressure of the clamp chamber; and V) a gear change control section for achieving a certain gear change ratio by outputting an instruction signal to the gear change control valve and the clamping force setting valve in accordance with a sensed traveling state, the gear change control method comprising:
a) a first step for calculating a primary thrust force of the movable pulley on the primary side,
b) a second step for calculating a secondary thrust force of the movable pulley on the secondary side,
c) a third step for selecting one of the primary thrust force and the secondary thrust force that is greater than the other, and
d) a fourth step for setting up a clamp chamber oil pressure by a following calculation:
dividing the selected one of the primary thrust force and the secondary thrust force by an addition of:
the clamp chamber's applied pressure area of one of the primary clamp chamber and the secondary clamp chamber, and
a cylinder chamber's applied pressure area of the cylinder chamber on a selected side.

16. A gear change control system of a belt-type continuously variable transmission which includes: I) a movable pulley piston chamber for causing a thrust force to a movable pulley which varies a groove width of each of a primary pulley and a secondary pulley, the pulley piston chamber having a double-piston constitution including: a) a clamp chamber including a primary clamp chamber and a secondary clamp chamber, for causing a clamp force for clamping a belt, and b) a cylinder chamber including a primary pulley cylinder chamber and a secondary pulley cylinder chamber, for causing a differential thrust force at a gear change; II) a communication passage communicating the primary clamp chamber with the secondary clamp chamber, a clamp chamber's applied pressure area on a primary side being substantially equal to a clamp chamber's applied pressure area on a secondary side; III) a gear change control valve for controlling an oil pressure of the cylinder chamber; IV) a clamping force setting valve disposed between an oil pressure source and the communication passage, the clamping force setting valve setting an oil pressure of the clamp chamber; and V) a gear change control section for achieving a certain gear change ratio by outputting an instruction signal to the gear change control valve and the clamping force setting valve in accordance with a sensed traveling state, the gear change control system comprising:
a) a first means for calculating a primary thrust force of the movable pulley on the primary side,
b) a second means for calculating a secondary thrust force of the movable pulley on the secondary side,
c) a third means for selecting one of the primary thrust force and the secondary thrust force that is greater than the other, and
d) a fourth means for setting up a clamp chamber oil pressure by a following calculation:
dividing the selected one of the primary thrust force and the secondary thrust force by an addition of:
the clamp chamber's applied pressure area of one of the primary clamp chamber and the secondary clamp chamber, and
a cylinder chamber's applied pressure area of the cylinder chamber on a selected side.

\* \* \* \* \*